UNITED STATES PATENT OFFICE.

ADOLPH BUSCH AND GERHARD SANDERS, OF PATERSON, NEW JERSEY.

COMPOSITION FOR PURIFYING WATER.

SPECIFICATION forming part of Letters Patent No. 589,638, dated September 7, 1897.

Application filed December 10, 1896. Serial No. 615,248. (No specimens.)

*To all whom it may concern:*

Be it known that we, ADOLPH BUSCH and GERHARD SANDERS, subjects of the Emperor of Germany, residing at the city of Paterson, county of Passaic, and State of New Jersey, have invented a new and useful Chemical Composition to be Used for Purifying and Filtering Water or other Liquids, of which the following is a specification.

Our composition consists of the following ingredients combined in the proportions and made by the process hereinafter described.

To two ounces of pure tin chlorid we add seven and one-half pounds of ordinary sawdust, which are placed in any suitable vessel and over which we pour boiling water until the chlorid and sawdust are totally covered. These ingredients are thoroughly mingled by agitation and boiled for two hours. The water is then drawn from the mixture and is again well covered with clear water, when four ounces of ordinary washing-soda are added and the mixture is then boiled again for one hour, being thoroughly stirred all the time. The water is then again drawn from the mixture, being thoroughly agitated for the purpose of washing away what can be removed of the washing-soda, when the mixture is again thoroughly rinsed in clear cold water. When thoroughly rinsed in cold water, it is again covered with warm water and one ounce of gelatin dissolved in a quart of boiling water is added, the whole being carefully mixed by agitation and allowed to settle for a quarter of an hour. The composition resulting from the mixture of the sawdust treated as above stated, and the gelatin is then taken and pressed into cakes and placed in a galvanized-iron tank having three compartments made by the insertion of two perforated partitions, the water-inlet being at one end of the tank and the outlet at the opposite end. The central or middle compartment is filled with the composition of sawdust and gelatin resulting from the above treatment and the two end compartments are filled with coke. To purify and filter the water, it is passed through said filter filled as herein stated. When necessary, said filter may be reversed and thus cleaned out and used until necessary to reverse it again.

The process in making larger quantities of our composition is the same, the ingredients and the articles used in the treatment thereof being increased in the same proportion.

Having described the process by which our chemical composition is made and the product resulting from such process and having described the process of using said composition for purifying water, what we claim, and desire to secure by Letters Patent of the United States, is—

The herein-described composition of matter to be used for filtering and purifying water consisting of sawdust, treated as herein stated with tin chlorid and washing-soda, and gelatin in the proportions specified.

ADOLPH BUSCH.
GERHARD X SANDERS.
his mark

Witnesses:
CHARLIE HAWARD,
WILLIAM SCHNEIDER.